(12) United States Patent
Bennington

(10) Patent No.: US 6,640,851 B1
(45) Date of Patent: Nov. 4, 2003

(54) SHAFT ASSEMBLY FOR STUMP CUTTER

(76) Inventor: John T. Bennington, 12635 Bentbrook Dr., Chesterland, OH (US) 44026

( * ) Notice: Subject to any disclaimer, the term of this patent is extended or adjusted under 35 U.S.C. 154(b) by 0 days.

(21) Appl. No.: 10/062,219

(22) Filed: Feb. 1, 2002

(51) Int. Cl.[7] .............................................. A01G 23/06
(52) U.S. Cl. ................ 144/24.12; 144/334; 241/101.2; 299/39.4; 37/302; 123/196 R
(58) Field of Search .............................. 144/24.12, 334, 144/375; 123/196 R; 299/78, 39.4; 241/101.2, 101.74; 277/513, 516, 517; 415/112, 116, 131, 172.1; 404/91; 37/302, 903

(56) References Cited

U.S. PATENT DOCUMENTS

| | | | | |
|---|---|---|---|---|
| 5,158,126 A | * | 10/1992 | Lang | 144/375 |
| 5,355,918 A | * | 10/1994 | Lang | 144/24.12 |
| 5,794,673 A | | 8/1998 | Milbourn et al. | 144/24.12 |
| 5,975,644 A | * | 11/1999 | Lang | 299/39.4 |
| 6,234,414 B1 | * | 5/2001 | DeVitis | 241/101.2 |
| 6,305,445 B1 | | 10/2001 | Falatok | 144/24.12 |

* cited by examiner

*Primary Examiner*—W. Donald Bray
(74) *Attorney, Agent, or Firm*—James A. Lucas

(57) ABSTRACT

A stump grinding apparatus of the type adapted to be mounted in a frame on the end of a boom is described. The apparatus comprises a grinding wheel mounted between hubs keyed to a shaft that is connected though belts and gears to a source of motive power, such as a diesel engine. A pair of non-adjustable roller bearings are used to provide relative movement of the shaft and grinding wheel in the frame. The apparatus includes means for providing lubrication between relatively moving parts so that the life of the bearings and other component parts can exceed 5000 hours of use without failure. The shaft assembly includes dimensional tolerances that protect the moving parts from the ingress of dirt and other debris. The materials of construction are selected to also enhance trouble-free operation.

18 Claims, 2 Drawing Sheets

SHAFT ASSEMBLY FOR STUMP CUTTER

BACKGROUND OF THE INVENTION

1. Field of the Invention

This invention relates to the field of stump grinding machines, particularly with respect to the shaft assembly useful with a grinding wheel for grinding tree stumps. More specifically, it relates to such an assembly useful with a boom-end mounted stump grinder.

2. Description of the Related Art

It is known to provide a stump grinding apparatus to cut and dispose of tree stumps. The device finds use for agricultural applications, for proper lawn maintenance and care, and for site development. It is often required to lower a protruding stump to a level that is below grade so that it will not interfere with plowing, disking and other farm tasks. For pleasing appearance of residential lawns, stumps of dead and fallen trees must likewise be cut away to a point that is below grade to allow for soil to be placed thereover for seeding or planting. When used for site development, the apparatus removes the stumps, thereby permitting soil to be moved as needed.

Typically, such a device includes a rotatable grinding wheel having a plurality of cutting teeth disposed circumferentially about the wheel. The wheel can be powered by a chain drive, or by gear or belt, or may be at the end of a movable boom driven by a diesel or gasoline engine. The grinding wheel commonly encounters more than just wood when performing its tasks. The wheel may be brought into contact with rocks and all manner of buried debris, such as re-bar, wire, cinder block and other materials of construction. The stump grinding operation places tremendous radial and axial loads on the wheel, the drive shaft and other component parts associated with the wheel assembly.

One particular stump grinder is mounted on the end of an excavator boom and uses a self-contained diesel engine and a combination belt and gear drive to rotate the grinding wheel. The wheel is mounted on a drive shaft that is supported in a frame at the end of the boom. Grinders of this type are manufactured by Sneller Machine Co., Cleveland, Ohio, and are referred to as the Sneller Stump Mill. The drive shaft rotates in two sets of roller bearings. Because of the encounters with miscellaneous debris during grinding, the bearings are subject to tremendous lateral and axial stress. The bearings and grease seals are exposed to entanglement with wire that can become wrapped around the shaft and can damage or destroy the grease seals around the bearings, causing premature failure of the bearings. Furthermore, with improper tolerances and clearances between the rotating and non-rotating parts of the assembly, bearing wear can be substantial, thus necessitating shutdown and repair of the stump grinder. Because of the costs associated with the disassembly and repair of the equipment, and the associated non-productive time, ways are constantly being sought for reducing downtime.

BRIEF DESCRIPTION OF THE INVENTION

It is an objective of the present invention to increase the length of the in-service time intervals for a stump grinder. Another objective is to reduce the time and expense for maintenance of a stump grinder.

These and other objectives and advantages will become apparent upon a reading of the description that follows.

The present invention relates to a boom-end stump grinder utilizing a shaft assembly providing maintenance-free service. The invention furthermore relates to an improved shaft assembly for use with a boom-end stump grinder.

The invention relates to a mounting arrangement for the cutter wheel of a stump grinder. The arrangement is a shaft assembly that comprises a shaft having an inboard end adapted to engage a rotational power source, and an outboard end distal from the power source. An inboard hub is mounted on the shaft for rotation therewith and an outboard hub likewise is mounted on the shaft for rotation therewith. Each hub includes a radially extending flange defining a gap between the two flanges to receive a cutter wheel. An annular cast iron shell surrounds the shaft and is separated therefrom by an inboard roller bearing and by a layer of lubricant. The shell is separated from the inboard hub by a labyrinth typically filled with grease. A second annular cast iron shell surrounds the shaft and is separated therefrom by an outboard roller bearing and a layer of lubricant. The shell is separated from the outboard hub by a second grease labyrinth. The shaft and hubs are rotationally movable with respect to the two cast iron shells. Typically, both the inboard bearing and the outboard bearing are non-adjustable double roller bearings. The labyrinths are located axially between the two cast iron shells and the respective inboard or outboard hubs. A gap is maintained between each of the shells and the shaft. This gap is no greater than about 0.100, and preferably no more than 0.080", and is filled with lubricant supplied from the labyrinth. Likewise, a gap is maintained between each of the cast iron shells and an axially extending portion of the respective hub. This gap is no greater than about 0.150, and preferably no more than 0.125", and contains lubricant supplied from the labyrinth. The length of the axially extending portion of each hub is at least about 1".

In another aspect of the invention, a shaft assembly is adapted to be mounted on a stump grinder frame and comprises a cutter wheel secured between two hubs, the hubs mounted for rotation with a shaft. The shaft has an inboard end adapted to engage a rotational power source, and an outboard end. The two hubs comprise an inboard hub and an outboard hub, each hub including a radially extending flange defining a gap between the two flanges to receive the cutter wheel. An inboard cast iron shell surrounds the shaft and is separated from the shaft by an inboard roller bearing and by a layer of lubricant. The inboard shell is separated from the inboard hub by a grease labyrinth. An outboard cast iron shell surrounds the shaft, and is separated therefrom by an outboard roller bearing and by a layer of lubricant. The shell is separated from the outboard hub by a grease labyrinth. The two cast iron shells are adapted to be mounted in a frame at the end of the boom. Preferably, the inboard bearing and the outboard bearing are non-adjustable double roller bearings. A gap is maintained between each of the shells and the shaft of no greater than about 0.080", and the gap is filled with grease supplied from the labyrinth. Similarly, a gap is maintained between each of the shells and an axially extending portion of the respective hub of no greater than about 0.125", wherein the gap contains lubricant supplied from the labyrinth. The length of the axially extending portion of each hub preferably is at least about 1 inch. An annular sleeve engages and surrounds the outboard end of the shaft. The sleeve has a radially outwardly extending flange at one end thereof that abuts a shoulder on the shaft, and has external threads at the opposite end to receive a lock washer and nut. The shaft and sleeve are keyed to prevent rotational slippage of the sleeve on the shaft. The inner race of the outboard bearing is press fit on the outer surface of the sleeve and abuts the radially outwardly extending flange of the sleeve.

DETAILED DESCRIPTION OF THE INVENTION

The present invention relates to a boom end stump-grinding wheel mounted on a shaft driven by a power source, such as an internal combustion diesel engine. The stump grinder will not be described in detail but is the type typically used on the Sneller Stump Mill. It has a 2" thick by 42" diameter cutter wheel mounted on a shaft driven by an internal combustion engine, such as a 200 or 275 horsepower Cummins diesel engine. The engine is joined to a drive shaft onto which the cutter wheel is assembled. Through a series of belts and gears, the engine drives the grinding wheel at a rotational speed of about 500 to 800 RPM.

The bearings used in the Sneller Stump Mill typically are non-adjustable, two row, tapered roller bearings having a one piece double outer race, and two inner races. The faces of the inner race are extended so that they abut, thereby eliminating the need for a separate inner race spacer. Bearings of this type are available from various manufacturers, such as The Timken Company of Canton, Ohio. To function properly, these bearings require proper lubrication. For this purpose, each bearing is lubricated by grease supplied from two separate reservoirs, each of which is designed to avoid leakage and to protect from ingress of dirt and debris. According to the present invention, it has been found that the stump grinder can be used for 5000 hours or more without bearing failure or before fatigue spall develops. At 500 revolutions per minute, this is equivalent to at least 15 million revolutions.

Figure 1:
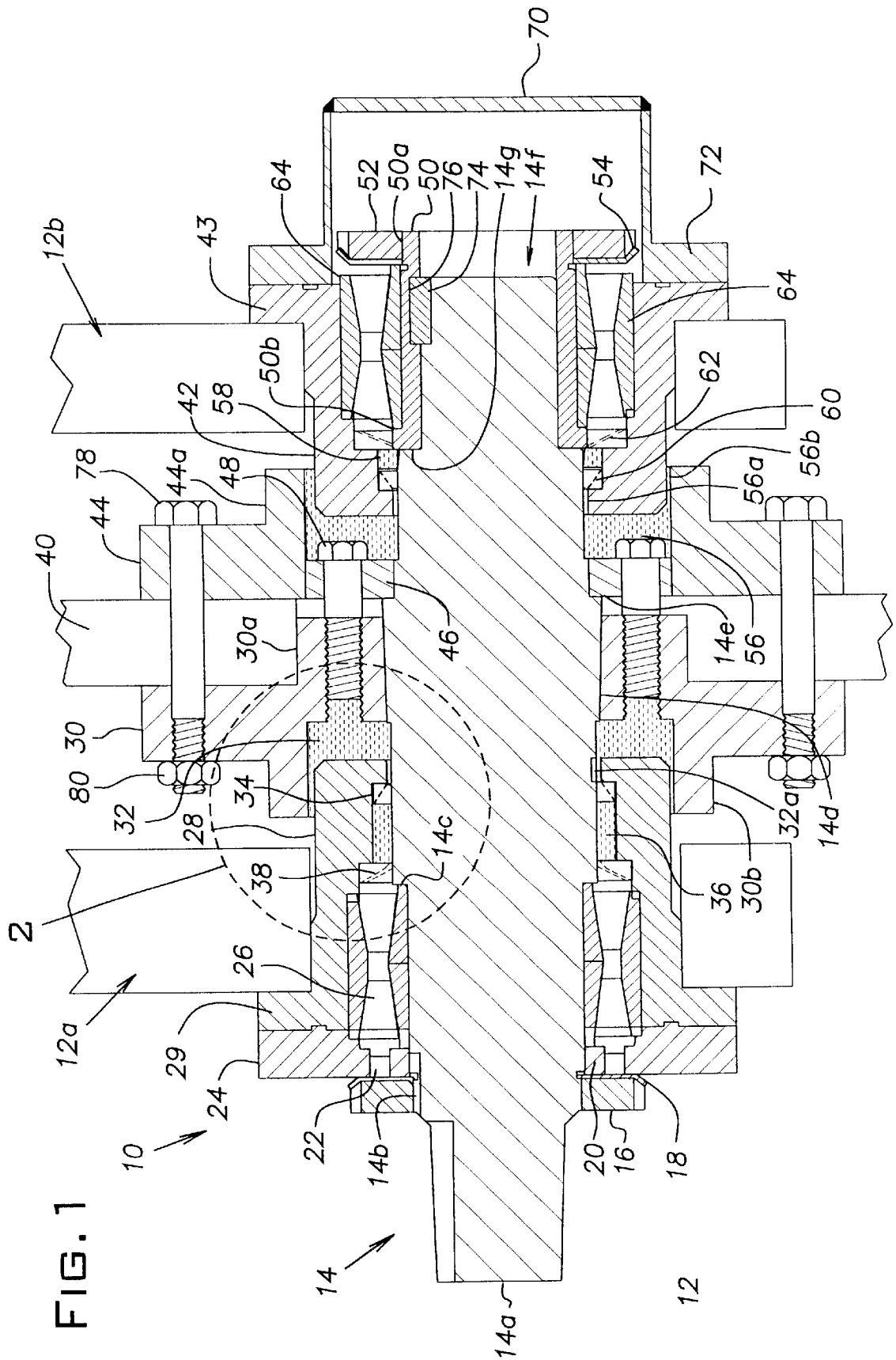
FIG. 1 is a sectioned view of the shaft assembly of the present invention.
Figure 2:
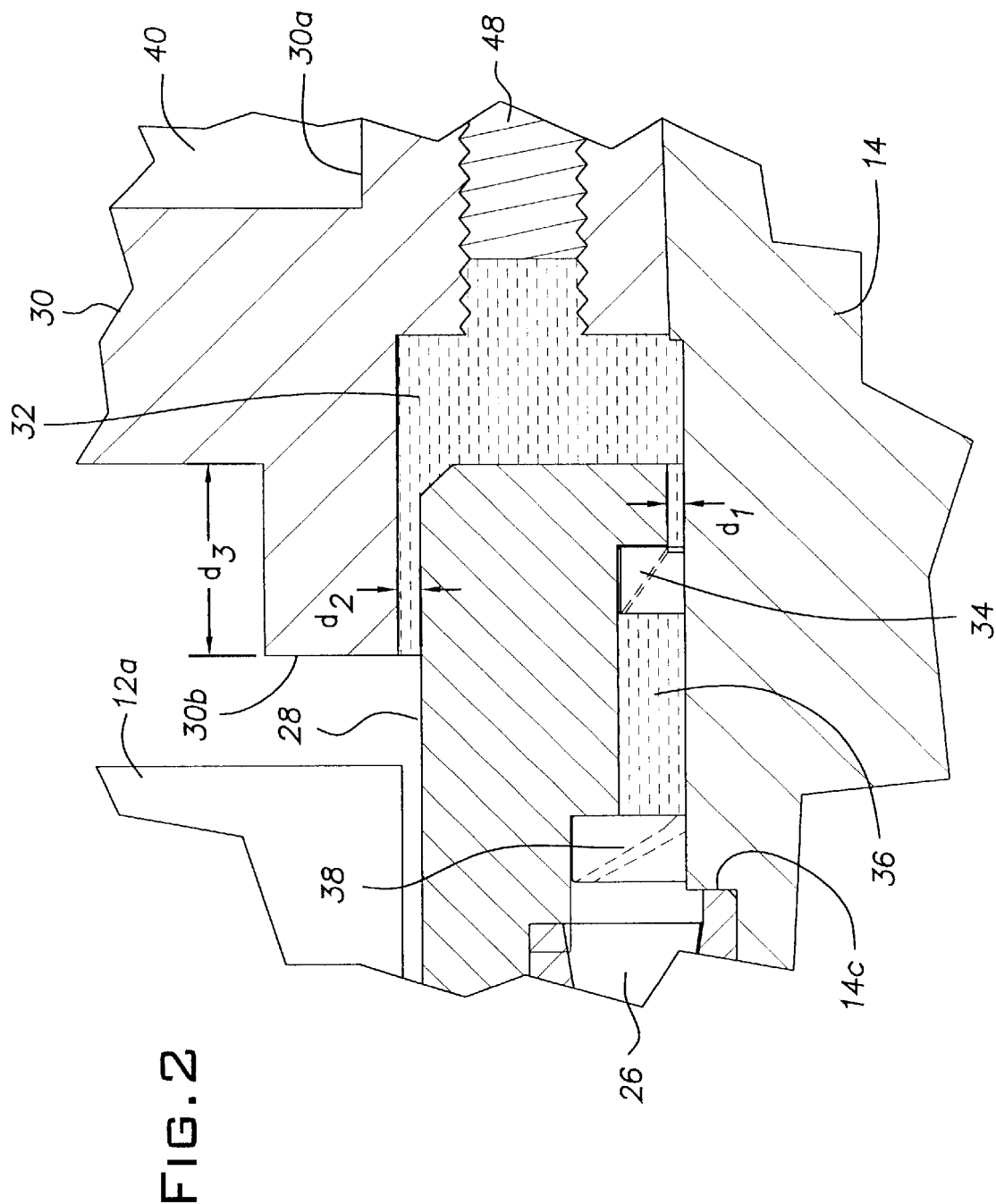
FIG. 2 is an enlarged view taken along line 2–2' of FIG. 1.

Turning now to FIG. 1, there is shown the overall shaft assembly 10 mounted within two arms 12a and 12b of a frame of the stump grinder. The frame arm and the boom and are not part of the present invention but are identified as representative of the environment in which the present invention is used.

The assembly 10 includes a shaft 14 having a drive end 14a connected through belts and gears to the engine output (none of which is shown). Next to the drive end 14a, the shaft includes a first threaded surface 14b that receives a nut 16 and a lock washer 18. The nut and washer abut a ring 20 on which a grease seal 22 runs. An inboard, tapered roller bearing 26 is pressed on to the shaft 14 until the inner race abuts a shoulder 14c on the shaft. An end cap 24 is bolted or otherwise secured to a flange 29 of an inboard cast iron shell 28 and serves to limit any axial movement of the outer race of the bearing 26. The nut 16 threaded onto the shaft prevents the axial movement of the inner race. The outer race of the bearing is fitted into a recess formed by and between the cast iron shell 28 and the outer plate 24.

An inboard hub 30 is mounted on a tapered portion 14d of the shaft 14. The hub is separated from the shell 28 by a labyrinth 32 filled with grease. The labyrinth includes a first layer of grease in the narrow gap 32a between the shaft 14 and the cast iron sleeve 28. This gap has a radial width $d_1$ less than about 0.10 inches and preferably less than 0.08 inches, and is filled with grease from the labyrinth. Grease from the labyrinth also fills a gap 32b between the shell 28 and the axial flange 30a of the inboard hub 30. This gap $d_2$ is less than about 0.15 inches and preferably is less than 0.125 inches. A grease seal 34 forms the separation between the labyrinth 32 and a grease reservoir 36. A double seal 38 separates the bearing from the reservoir 36.

A cutter wheel 40 (shown in outline) is mounted on a rim 30b of the inboard hub 30. An outboard shell 42 made of cast iron abuts a shoulder 14e on the shaft 14. The shell 42 is supported in the second arm 12b of the frame. An outboard hub 44 slips around a bolt ring 46 that abuts a shoulder 14e of the shaft 14. The bolt ring 46 is secured to the inboard hub by a plurality of bolts 48 which draw the left-hand hub 30 against the tapered portion 14d of the shaft 14 to insure a tight fit between the hub and the shaft. A slotted keyway (not shown) in the outboard hub and the shaft engages a key in a manner that is well known in the art, serving to prevent relative rotation of the outer hub with respect to the shaft 14. Obviously, with the two hubs bolted together, the inner hub is prevented from slippage as well. A plurality of bolts 78 and nuts 80 secure the cutter wheel 40 between the two hubs 30, 44.

It has unexpectedly been discovered that using cast iron instead of steel for the annular inboard and outboard shells 28, 42 serves to prevent freeze welding of the stationary shells to the rotating steel shaft.

The outer end 14f of the shaft 14 receives a sleeve 50 having a flange 50b which abuts shoulder 14g on the shaft. The sleeve is prevented from relative rotation with respect to the shaft by the key 74 engaging slots that form a keyway 76 in the shaft and sleeve. The outer end of the sleeve 50 is threaded on the exterior surface 50a to receive a nut 52 and lock washer 54. The outboard bearing 64 is press fit on to the sleeve 50 and is secured in place by the nut 52 threaded on to the sleeve. The lock washer 54 prevents the nut from coming loose. The use of the threaded sleeve has been found to minimize maintenance problems by reducing the likelihood of the outboard bearing becoming loose on the shaft. A loose outer bearing has been found to place a substantial additional strain on the inboard bearings and on the shaft. This can cause breakage of the shaft at the inboard end. Furthermore, any lateral forces applied through the grinder wheel or hub to the shaft when the shaft is suspended only in the inboard bearing can cause serious misalignment of the shaft and damage to the drive train.

A flanged outer cap 70 is secured to the outer shell 42, preferably with the use of bolts (not shown) passing through the flange 72 to protect the shaft from dirt and debris. In like manner, the cap 70 and shell 42 are secured to the outboard arm 12b of the frame of the stump grinder using suitable fastening means, such as bolts (not shown).

Permanent lubrication is provided between the outboard hub 44 and the cast iron shell 42, and between the shell 42 and the outboard bearing 64, in the same manner as previously described in connection with the lubrication surrounding the inboard bearing 26 and the stationary components. The hub 44 is separated from the shell 42 by a labyrinth 56 filled with grease. The labyrinth supplies grease to the narrow gap 56a between the shaft 14 and the shell 42. This gap is less than about 0.10 inches and preferably less than 0.08 inches. A layer of grease fills the narrow gap 56b between the shell 42 and the outboard hub 44. The radial thickness of the second gap is less than about 0.15 inches and preferably less than about 0.125 inches. The grease seal 60 forms the separation between the labyrinth 56 and a grease reservoir 58. The double seal 62 prevents grease from working into the bearing from the reservoir 58.

The inboard hub 30 and the outboard hub 44 each have an axially extending flange portion (30a, 44a) that has a width $d_3$ that extends at least about one inch along the axis of the shaft. This extended flange has unexpectedly been found to prevent cable or wire, often encountered at a construction site, from winding around the shaft and working its way into a labyrinth. It also serves to provide an improved seal to prevent the leakage of grease between the steel hubs and the cast iron shells. Maintaining a preferred clearance of 0.125 inches or less between the relatively moving parts further reduces the likelihood of leakage of grease or the ingress of dirt and debris into the labyrinth.

The device may be assembled in the following manner. The inboard hub 30 is slipped into place around the tapered portion 14d of the shaft 14. The cutter wheel 40 is slipped onto the rim 30b of the hub. The outboard hub 44 is placed around the outboard end of the shaft until it abuts the shoulder 4e of the shaft. The hubs are then drawn together with a plurality of bolts 48 that extend through holes aligned in the outboard hub and the wheel, and that are threaded into tapped holes in the inboard hub 30. The shaft sub-assembly is mounted in the arms 12a, 12b of the frame. The inboard shell 28 is placed around the shaft. The grease seal 34 is inserted into place and the second grease seal 38 is placed over the shaft. The inboard bearing 26 is pressed onto the shaft until it abuts the shoulder 14c on the shaft 14, after which ring 20 is threaded on to the shaft. The outer grease seal 22 is placed therearound and the inboard end plate 24 is bolted through the flange 29 of the inboard sleeve 28 into the frame arm 12a. The lock washer 18 is placed around the shaft and nut 16 is threaded on to the shaft and is tightened to anchor the inboard bearing securely in position.

In like manner, the outboard shell 42 is placed around the shaft. The grease seal 60 is inserted into place and an additional grease seal 62 is placed over the shaft. The sleeve 50 is pressed onto the outboard end of the shaft and is prevented from slipping on the shaft by a key 74 inserted into a slotted keyway 76 in the shaft and the sleeve. The sleeve 50 includes a flange 50b. The outboard bearing 64 is pressed on the sleeve 50 until the bearing abuts the flange 50b and the flange 43 on the outboard shell 42. A nut 52 and lock washer 54 secure the outboard bearing in place. This arrangement of the external threads on the sleeve and the nut to secure the outboard bearing in place unexpectedly reduces the likelihood of damage to the inboard end of the shaft.

The end cap 70 includes a flange 72 having a plurality of holes that match up with corrresponding holes in the flange 43 of the outboard shell 42 and the arm 12b of the frame. A plurality of bolts (not shown) are used to secure the outboard end of the shaft assembly to the frame.

After the components have been assembled, the grease reservoir and labyrinth are filled with grease by providing grease fittings and passages extending through the bearing housings and into the reservoirs. The grease is then forced into each of the reservoirs, and from there passes through the grease seals (34, 60) into the labyrinths. As part of the routine maintenance of the assembly, it should be regreased on a regular basis after a few hours of operation.

While the invention has been described in combination with embodiments thereof, it is evident that many alternatives, modifications and variations will be apparent to those skilled in the art in light of the foregoing teachings. Accordingly, the invention is intended to embrace all such alternatives, modifications and variations as fall within the spirit and scope of the appended claims.

What is claimed is:
1. A mounting arrangement for the cutter wheel of a stump grinder comprising:
   a) a shaft having an inboard end adapted to engage a rotational power source, and an outboard end distal from the power source;
   b) an inboard hub mounted on the shaft for rotation therewith, and an outboard hub mounted on the shaft for rotation therewith, each hub including a radially extending flange defining a gap between the two flanges adapted to receive a cutter wheel;
   c) an inboard cast iron shell surrounding the shaft and separated therefrom by an inboard roller bearing and by a layer of lubricant, and separated from the inboard hub by a grease labyrinth; and
   d) an outboard cast iron shell surrounding the shaft, separated therefrom by an outboard roller bearing and a layer of lubricant, and separated from the outboard hub by a grease labyrinth;
the shaft and hubs rotationally movable with respect to the two cast iron shells.

2. The mounting arrangement according to claim 1 wherein both the inboard bearing and the outboard bearing are double roller bearings.

3. The mounting arrangement according to claim 1 wherein the labyrinth is filled with grease as the lubricant.

4. The mounting arrangement according to claim 3 wherein a gap is maintained between each of the shells and the shaft of no greater than about 0.080", wherein the gap is filled with grease supplied from the labyrinth.

5. The mounting arrangement according to claim 3 wherein a gap is maintained between each of the shells and an axially extending portion of the respective hub, the gap being no greater than about 0.125", wherein the gap contains lubricant supplied from the labyrinth.

6. The mounting arrangement according to claim 5 wherein the length of the axially extending portion of each hub is at least about one inch.

7. The mounting arrangement according to claim 1 further including an annular sleeve engaging and surrounding the outboard end of the shaft, the sleeve having a radially outwardly extending flange at one end thereof abutting a shoulder on the shaft, and being threaded at the opposite end to receive a lock washer and nut.

8. The arrangement according to claim 7 wherein a key engages a keyway in the shaft and the sleeve to prevent rotational slippage of the sleeve on the shaft.

9. The arrangement according to claim 7 wherein the inner race of the outboard bearing engages the outer surface of the sleeve.

10. A shaft assembly adapted to be mounted on a stump grinder frame and comprising a cutter wheel secured between two hubs, the hubs being mounted for rotation with a shaft, the shaft having an inboard end adapted to engage a rotational power source, and an outboard end; the hubs comprising an inboard hub and an outboard hub, each hub including a radially extending flange defining a gap between the two flanges to receive the cutter wheel; an inboard shell surrounding the shaft and separated therefrom by an inboard roller bearing and by a gap containing a layer of lubricant, said shell being separated from the inboard hub by a grease labyrinth; and an outboard shell surrounding the shaft, separated therefrom by an outboard roller bearing and a gap containing a layer of lubricant, and separated from the outboard hub by a grease labyrinth; the gaps between each of the shells and the shaft being no greater than about 0.080", the two shells adapted to be mounted in a frame at the end of the boom.

11. The shaft assembly according to claim 10 wherein both the inboard bearing and the outboard bearing are non-adjustable double roller bearings.

12. The shaft assembly according to claim 10 wherein the gaps are filled with grease supplied from the labyrinths.

13. The shaft assembly according to claim 12 wherein a gap is maintained between each of the shells and an axially extending portion of the respective hub of no greater than about 0.125", and each gap contains grease supplied from the labyrinth.

14. The shaft assembly according to claim 13 wherein the length of the axially extending portion of each hub is at least about one inch.

15. The shaft assembly according to claim 10 further including an annular sleeve pressed onto the outboard end of the shaft, the sleeve having a radially outwardly extending flange at one end thereof abutting a shoulder on the shaft, said sleeve being externally threaded at the opposite end to receive a lock washer and nut.

16. The shaft assembly according to claim 15 wherein a key engages a keyway in the shaft and the sleeve to prevent rotational slippage of the sleeve on the shaft.

17. The shaft assembly according to claim 16 wherein the inner race of the outboard bearing is press fit on the outer surface of the sleeve into abutment with the radially outwardly extending flange thereof.

18. The shaft assembly according to claim 10 wherein the inboard and outboard shells are made of cast iron.

* * * * *